United States Patent
Agarwal et al.

(10) Patent No.: US 11,930,116 B2
(45) Date of Patent: Mar. 12, 2024

(54) SECURELY COMMUNICATING SERVICE STATUS IN A DISTRIBUTED NETWORK ENVIRONMENT

(71) Applicant: ADOBE INC., San Jose, CA (US)

(72) Inventors: Prafull Agarwal, Agra (IN); Vijay Kumar Sahu, Ghaziabad (IN); Catalin Sanda, Bucharest (RO)

(73) Assignee: Adobe Inc., San Jose, CA (US)

( * ) Notice: Subject to any disclaimer, the term of this patent is extended or adjusted under 35 U.S.C. 154(b) by 443 days.

(21) Appl. No.: 17/395,123

(22) Filed: Aug. 5, 2021

(65) Prior Publication Data

US 2023/0042508 A1 Feb. 9, 2023

(51) Int. Cl.
| | |
|---|---|
| *H04L 29/06* | (2006.01) |
| *H04L 9/08* | (2006.01) |
| *H04L 9/32* | (2006.01) |
| *H04L 67/1097* | (2022.01) |

(52) U.S. Cl.
CPC .......... *H04L 9/3213* (2013.01); *H04L 9/0825* (2013.01); *H04L 9/3247* (2013.01); *H04L 67/1097* (2013.01); *H04L 2209/60* (2013.01)

(58) Field of Classification Search
CPC ... H04L 9/3213; H04L 9/0825; H04L 9/3247; H04L 67/1097; H04L 2209/60
See application file for complete search history.

(56) References Cited

U.S. PATENT DOCUMENTS

| | | | | |
|---|---|---|---|---|
| 9,807,104 B1* | 10/2017 | Sarra | ...................... | H04L 63/102 |
| 9,900,639 B2* | 2/2018 | Mares | ................. | H04N 21/2393 |
| 10,178,098 B2* | 1/2019 | Sanso | ................. | H04L 67/1097 |
| 2015/0030245 A1* | 1/2015 | Bose | ..................... | H04N 19/426 |
| | | | | 382/233 |
| 2015/0149530 A1* | 5/2015 | Maret | .................... | H04L 67/563 |
| | | | | 709/203 |
| 2015/0248542 A1* | 9/2015 | Mahadevan | ............ | G06F 21/10 |
| | | | | 726/27 |
| 2015/0254441 A1* | 9/2015 | Sanso | ...................... | G06F 21/41 |
| | | | | 726/9 |

(Continued)

FOREIGN PATENT DOCUMENTS

| | | | | |
|---|---|---|---|---|
| CN | 1494257 | A | * 5/2004 | |
| CN | 108900480 | A | * 11/2018 | ............. H04L 63/08 |

(Continued)

*Primary Examiner* — Sher A Khan (74) *Attorney, Agent, or Firm* — Shook, Hardy & Bacon L.L.P.

(57) ABSTRACT

A monitoring service monitors performance of an authentication application that authenticates a user or service and securely communicates a status of the authentication application to a service application providing a software service. The monitoring service generates a token using a private key. The token is stored in a secure datastore writable only by the monitoring service and is also provided to the service application. The service application validates a signature of the token using a public key and determines an authenticity of the token by comparing the received token to the stored token in the secure datastore. In doing so, there is a high degree of confidence that the token, or an associated encrypted message, originated from the monitoring service and properly identifies the status of the authentication application.

20 Claims, 6 Drawing Sheets

(56) References Cited

U.S. PATENT DOCUMENTS

| | | | | |
|---|---|---|---|---|
| 2018/0255189 A1* | 9/2018 | Granby | .............. | H04N 1/00079 |
| 2019/0068636 A1* | 2/2019 | Wang | .................... | G06Q 20/352 |
| 2019/0124070 A1* | 4/2019 | Engan | .................... | H04L 9/3247 |
| 2020/0310779 A1* | 10/2020 | Van Heuklon | ............ | G06F 8/65 |
| 2020/0366754 A1* | 11/2020 | Wang | .................... | H04L 9/3297 |
| 2022/0038891 A1* | 2/2022 | duPont | .................... | G06V 10/25 |
| 2022/0150066 A1* | 5/2022 | Sugarev | .................... | H04L 9/30 |

FOREIGN PATENT DOCUMENTS

| | | | | | |
|---|---|---|---|---|---|
| CN | | 110290102 A | * | 9/2019 | |
| WO | WO-2020212349 A1 | * | 10/2020 | ........... | G06F 21/602 |

* cited by examiner

SECURELY COMMUNICATING SERVICE STATUS IN A DISTRIBUTED NETWORK ENVIRONMENT

BACKGROUND

In distributed systems, various computer applications communicate to provide services to users. In accordance with a service application providing services to users, or devices associated therewith, an authentication application is typically used to authenticate the user. In some cases, however, an authentication application is disrupted such that the authentication application is unable to adequately perform user authentication for accessing the service application. In such cases, the service application is exposed to security risks. When the authentication application fails to authenticate users, the service application may provide unauthorized services, thereby possibly permitting misuse of the service application. This leaves open the possibility that a hacker might deceive the service application into providing unauthorized services to a non-authenticated user.

SUMMARY

At a high level, secure communication methods within a distributed system are provided. In a particular case, when there is a disruption in the performance of an authentication application, a message indicating the disruption can be delivered from a monitoring service monitoring the authentication application to a service application that provides services. The message is delivered in a manner that provides a high degree of confidence that the message originated from the monitoring service, rather than having a malicious origin, and indicates the correct status of the authentication application.

In operation, a monitoring service monitors the performance of an authentication application that authenticates users or services. Upon detecting a disruption in the performance of the authentication application, the monitoring service generates a token. In some implementations, the token is a JavaScript Object Notation (JSON) Web Token, also referred to as a "JWT." The monitoring service stores the token in a datastore to which only the monitoring service has write access. The token is generated using a private key of a public-private key pair. It comprises a header having a key identifier that can be used to identify a public key of the public-private key pair. The token further comprises a unique identifier, an expiry indicator, and a signature generated by the private key. The monitoring service stores the token in a secure datastore primarily controlled by the monitoring service. In addition to storing the token in the secure datastore, the monitoring service sends the token to a service application that provides a service to a user.

The service application receives the token generated by the monitoring service. To ensure the authenticity of the token, the monitoring service can validate the token by retrieving the public key using the key identifier of the token. The public key can then be used to validate the signature is authentic, meaning that it was signed by the private key used by the monitoring service. Additionally, the service application may compare the unique identifier of the received token with the unique identifier of the stored token that is stored in the secure datastore with write access only by the monitoring service. The received token is authentic where the unique identifiers match and when the signature is validated as being signed by the private key of the monitoring service. When the signature is valid and the unique identifiers match, then the service application may modify service provided to the user based on the disruption in the performance of the authentication application. This may include issuing a temporary license or restricting certain access rights to a software service of the user until the authentication application can establish the authenticity of the user.

The service application may employ an additional safeguard by storing the unique identifiers of received tokens temporarily until the tokens expire. When the service application receives a token, it can compare the unique identifier of the token with those stored in the database to ensure that it does not process the same token more than one time before the token expires, thereby reducing the likelihood of a replay attack.

This summary is intended to introduce a select concept in a simplified form that will be further described in the description. This example is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Overview

While conventional distributed systems utilize various communication methods, many conventional systems employ single factor authentication to ensure the validity of messages received from other applications of the distributed system. Many of these systems rely only on encryption as the single factor for authenticating messages.

In some situations, hackers might exploit this single factor authentication. In particular, hacking attempts that retrieve a private key could send a message signed by the private key. In this scenario, a service application might believe the message is authentic when it only uses encryption to validate the message that is signed by, or otherwise encrypted by, the private key.

Moreover, in some cases, a hacker might attempt to intercept a message and copy a legitimate token created by the private key. The hacker might send a subsequent message to an application with the copied token, attempting to deceive the application into treating the message as authentic by validating a signature of the copied token using the public key.

While these hacking attempts might be performed in any distributed network of applications, they pose a particular problem when the applications involve authenticating users, as different users have different access rights to a software service. If a hacker is improperly authenticated, then the hacker could be given higher levels of access rights than should be given. One particular attempt to gain improper access rights to a service application occurs when a hacker deceives a service application into performing in a manner inconsistent with the status of an authentication application. For instance, if the service application is not able to properly identify the status of the authentication system, then the service application could be manipulated to provide services to end users or services that are not legitimate, e.g., users that do not have a license to access certain features of a software program.

Given that a hacker might attempt to exploit the communication between an authentication application and a service application so that the service application provides services to an unauthenticated user it is beneficial to ensure secure communication between various applications (e.g., such as those in a distributed network), including communication to a service application about the status of an authentication application. By doing so, the service application can take the appropriate actions based on proper identification of the authentication application status.

Accordingly, and as described herein, one method of communication that provides additional security over the conventional methods and helps thwart these types of hacking attempts, thereby improving the security of the computers running the applications and the security of the network, utilizes a monitoring service that monitors an authentication application and writes to a secure datastore readable by a service application. More particularly, a monitoring service monitors the performance of an application, such as an authentication application. The monitoring service communicates a status of the authentication application to another application, such as a service application, within a distributed network. Where there is a disruption in the performance of the authentication application, the monitoring system may securely communicate an indication of the disruption as the status to the service application so that the service application can modify its services accordingly.

To as part the secure communication, the monitoring service generates a token. The token is generated and signed using a private key, and in a specific case, includes a plain-text message associated with the signature. The token is a JavaScript Object Notation (JSON) Web Token (JWT) in a specific example suitable for use with the technology. A JWT provides some additional benefits. For instance, it may be sent via an encrypted HTTPS (Hypertext Transfer Protocol Secure) channel, included as part of a POST body, or other like methods. This helps increase the speed of delivery when compared to some other tokens. JWTs can also be employed with public-private key pairs that are used for signing and validating the JWTs.

The generated token is stored in a secure datastore by the monitoring service. The secure datastore is writable by the monitoring service, and it can be configured so that it is writable only by the monitoring service. This method provides a level of confidence that the monitoring service is the entity that stored the token in the secure datastore, and that the token did not originate elsewhere. The secure datastore is also configured to be readable by the service application. In addition to storing the token in the secure datastore, the monitoring service sends the token to the service application.

The service application validates the signature using the public key. Proper validation of the signature, which includes using the public key to verify that the token was signed by the private key of the monitoring service, is one factor of security to determine that the token was provided by the monitoring service. For instance, verification may comprise using a hashing algorithm to compute a hash value for the signature and, using the public key, determining that the hash value of the private key signature matches that of the computed hash value. The service application also reads the secure datastore and compares the received token with the stored token in the secure datastore. A second level of security is achieved when the received token, or an identifier thereof, matches that of the stored token, since the service application is confident that the stored token was stored in the secure datastore by the monitoring service. Having passed both validation and authentication methods, the service application may modify service according to a message associated with the received token, such as the status of the authentication application and whether the authentication application is experiencing a disruption. This two-layer security mechanism enhances the security over previous methods by making it less likely that a hacker has retrieved the private key and has generated messages with the private key, since there is a high degree of confidence that the tokens originate from the monitoring service, rather than another source. For instance, some aspects of the disclosed technology would require a hacker to compromise both the private key and the secure datastore to attempt an attack on the system, improving even conventional two-factor systems that lack the secure datastore.

To further enhance the security, the service application may store the received token, or at least a portion of it, such as a unique identifier of a JWT, in another datastore. The token may be stored for time equal to or greater than an expiration time of the token. When the service application receives a token, the service application can compare the received token with those stored in the datastore. If the token is not present, then the service application is confident that it has not validated or processed the received token previously. Put another way, by comparing the received token to those stored in the datastore writable by the service application, the service application is not inadvertently acting according to a message that it has already received, and which might be the subject of a hacking attempt to copy a previous token and include it in a subsequent message.

It will be realized that the method previously described is only an example that can be practiced from the description that follows, and it has been provided to more easily understand the technology and recognize its benefits. Additional examples will be described with reference to the figures.

Secure Communication System

Figure 1:
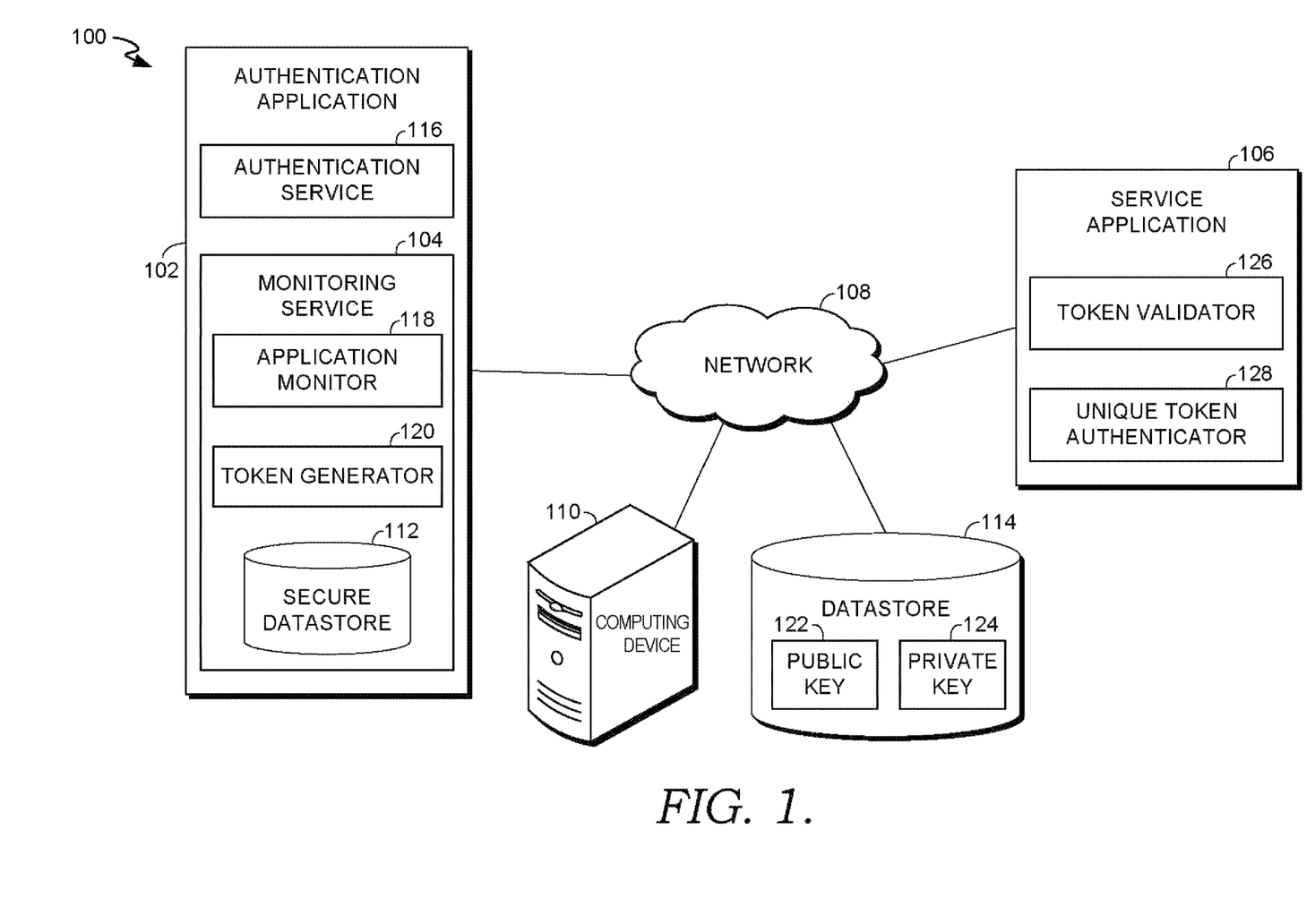
FIG. 1 is an example operating environment suitable for secure communication between an example monitoring service and an example service application.

With reference now to FIG. 1, FIG. 1 depicts an example operating environment 100 suitable for use in implementing the described technology. In particular, FIG. 1 shows a high-level architecture and operations of a distributed network that comprises authentication application 102 and service application 106 communicating via network 108. Authentication application 102 is illustrated comprising monitoring service 104. However, it will be realized that in some implementations of the technology, monitoring service 104 is a separate and distinct service.

While various arrangements of operating environment 100 are possible, one particular arrangement provides a distributed environment where two or more of authentication application 102, service application 106, or any components thereof are arranged in a distributed fashion. Additional components included in the example provided by FIG. 1 are computing device 110, secure datastore 112, and datastore 114.

Having identified various components of operating environment 100, it is noted again, and emphasized, that any additional or fewer components, in any arrangement, may be employed to achieve the desired functionality and are intended to be within the scope of the present disclosure. Although some components of FIG. 1 are depicted as single components, the depictions are intended as examples in nature and in number, and are not to be construed as limiting for all implementations. Other arrangements and elements (e.g., machines, interfaces, functions, orders, and groupings of functions, etc.) may be used in addition to or instead of those shown, and some elements may be omitted altogether for the sake of clarity.

Further, many of the elements described in FIG. 1 and elsewhere in this disclosure are functional entities that may be implemented as discrete or distributed components, or in conjunction with other components, and in any suitable combination and location. Various functions being performed by one or more entities may be carried out by hardware, firmware, or software. For instance, some functions are carried out by a processor executing computer-usable instructions stored in memory.

Moreover, these components, functions performed by these components, or services carried out by these components are implemented at appropriate abstraction layers, such as the operating system layer, application layer, hardware layer, and so forth, of the computing systems. Alternatively, or in lieu of, the functionality of these components or the embodiments of the technology are performed, at least in part, by one or more hardware logic components. For example, illustrative types of hardware logic components include field-programmable gate arrays (FPGAs), application-specific integrated circuits (ASICs), application-specific standard products (ASSPs), system-on-a-chip systems (SOCs), complex programmable logic devices (CPLDs), and the like. Additionally, although functionality is described with respect to specific components shown in operating environment 100, it is contemplated that in some aspects, functionality of these components are shared or distributed across other components, including those not illustrated by FIG. 1. For example, one or more of the components can alternatively or additionally reside on one or more front-end client devices.

Turning back to the components illustratively provided by FIG. 1, network 108 may include one or more networks, including public networks or virtual private networks (VPNs). Network 108 may include, without limitation, one or more local area networks (LANs) wide area networks (WANs), or any other communication network.

In general, datastores, including secure datastore 112 and datastore 114 provided in FIG. 1, store information, including data, computer instructions (e.g., software program instructions, routines, or services), or models used by aspects of the technology. Although each of secure datastore 112 and datastore 114 is depicted as a single database component, datastores such as these, may be embodied as one or more datastores or may be in the cloud. One suitable example of a datastore is ADOBE® Data Warehouse. Another suitable example includes an Amazon S3 bucket. Although it will be discussed in more detail with reference to FIG. 4, memory 412 of computing device 400 is generally suitable for use as a datastore, including secure datastore 112 and datastore 114.

Computing device 110 may generally initiate access to service application 106 to receive services. In implementations, a user accesses services provided by service application 106 based on authentication of the user by authentication application 102. To do so, the user may input credentials via computing device 110, such as a name and password. Authentication application 104 may authenticate the user so that service application provides services corresponding to the user's access rights based on the authentication. Computing device 110 represents at least one computer processor, one or more computer storage media storing computing-usable instructions that cause the processor to perform the one or more functions, or a combination of both. As noted elsewhere in this disclosure, computing device 110 represents one or more computing devices in communication with components of operating environment 100. An example computing device suitable for use as computing device 110 is provided with reference to FIG. 4.

For example, authentication application 102 can authenticate a user attempting to access services provided by service application 106 via computing device 110. Authentication application 102 generally authenticates a user or a service. While illustrated as an authentication application, it will be understood that the technology may be implemented with any distributed application, and as such, authentication application 102 may more broadly represent a first application performing any function in the distributed network.

Authentication application 102 comprises authentication service 116, which is generally responsible for employing a method of authenticating a user. By authenticating the user, authentication application 102 determines that a request for a particular service is being made by the user having the access rights as opposed to another user that does not have the same access rights. Authentication service 116 may employ any type of authentication method. One such method is password based. Another employs using a sign-on application that generates temporary codes and delivers the codes to a user. Other methods include verifying a user has access to another known service, such as sending links via email or SMS (short message service) texts. Additional methods are biometric based, such as facial or fingerprint identification, or another like method. Authentication service 116 may employ any number or combination of authentication methods.

Monitoring service 104 is generally configured to monitor an application and securely communicate to applications within the distributed network based on the monitoring. The example monitoring service 104 performs such functions utilizing application monitor 118 and token generator 120.

Monitoring service 104 is illustrated as part of authentication application 102. It will also be understood that in other embodiments, monitoring service 104 may be a stand-alone service in communication with authentication application 102.

Application monitor 118 is generally configured to monitor an application (e.g., authentication application 102). For instance, application monitor 118 can be configured to monitor authentication application 102. In a specific example, application monitor 118 monitors a status of authentication application 102, such as the performance of authentication application 102. Performance may include the usage of authentication application 102, such as central processing unit (CPU) usage or memory usage; status of a message log comprising a queue of authentication processing requests for authentication application 102; error rates or latency associated with authentication application 102; and other like performance metrics. Application monitor 118 may receive an indication that authentication application 102 is experiencing a performance disruption, or application monitor 118 may identify a performance disruption occurring with authentication application 102 based on determining a monitored performance metric is beyond a performance metric threshold.

Token generator 120 is generally configured to generate tokens. In particular, token generator 120 generally generates a token to securely communicate a status of an application, such as securely communicating the performance of authentication application 102 to service application 106. In this way, service application can have a high level of confidence that the received communication regarding the performance of authentication application 102 is in fact representative of its actual performance, as opposed to a hacking attempt to maliciously misidentify the performance of service application 106. The generated token may be associated with a message regarding a performance status of authentication application 102, which may include a plaintext message. For example, in accordance with identifying a disruption of authentication application 102, token generator 120 may generate a token for communicating a message indicating the disruption.

To generate the token, there are various encryption algorithms and signature algorithms that may be used by token generator 120 to securely communicate the message indicating the disruption. For instance, symmetric encryption methods can be used. Many of these methods employ a key for token generation. In such a scenario, a sending application or service that sends the token (such as monitoring service 104 that generates and sends the token associated with the message indicating the disruption) uses a key to generate a signature associated with a message that can be sent to a receiving application that receives the token (such as service application 106 that receives token from monitoring service 104) that also has the key and uses the key to verify the signature. Asymmetric encryption methods may also be employed. Such methods can use a public-private key pair to generate tokens as a signature using a private key and verify the signature using a public key. In this scenario, a sending application or service (such as monitoring service 104) can sign a message with a private key of the public-private key pair and send the message to a receiving application (such as service application 106) where the signature of the message is verified using a public key of the public-private key pair.

As noted previously, there are particular benefits to using methods employing JWTs. As such, token generator 120 may be configured to generate JWTs using private key 124 stored in datastore 114. Token generator 120 may employ private key 124 to generate a signature for a message. In some cases, private key 124 is unique to token generator 120, e.g., accessible only by token generator 120.

By way of example only, application monitor 118 monitors a performance of authentication application 102. Upon determining a disruption in the performance, by receiving a message of the disruption or detecting the disruption, based on the monitoring, token generator 120 encrypts a message comprising an indication of the disruption, or another application status, by generating a token associated with the encrypted message (e.g., comprising the encrypted message or corresponding with the encrypted message) using private key 124. Token generator 120 signs the token using private key 124.

A generated token, such as a generated JWT, may comprise one or more of the signature of private key 124, a header that identifies public key 122, a unique identifier that is unique to the generated token, and an expiry indication identifying an expiration time of the token. Public key 122 and private key 124 in this scenario are part of a public-private key pair. The expiry indication indicates when the token expires and, for instance, may identify a particular time or timeframe during which the token is valid, or other like method, thereby identifying the expiration time of the token. In some cases, a generated token may comprise a message, such as message related to system status. For instance, a message may include a system status of authentication application 102, such as whether authentication application 102 is experiencing a disruption.

Monitoring service 104 can send the generated token, e.g., the generated JWT, to another application. In a specific case, monitoring service 104 sends the generated token to service application 106. The generated token may cause service application 106 to validate and authenticate the token, as will be further discussed.

In addition to sending the generated token, monitoring service 104 can save the generated token in secure datastore 112. In general, secure datastore 112 is maintained by monitoring service 104. That is, secure datastore 112 is primarily maintained by monitoring service 104. Said differently, secure datastore 112 is writable by monitoring service 104, meaning that secure datastore 112 is configured to store information received from monitoring service 104. Monitoring service 104 is configured to save a generated token in secure datastore 112, thereby providing a stored token. In a more specific aspect, secure datastore 112 is configured such that only monitoring service 104 has write permissions to the database. In this case, only monitoring service 104 is able to store information in secure datastore. As previously discussed, by configuring write permissions of secure datastore 112 such that monitoring service 104 has write permission or only monitoring service 104 has write permission, there is a level of confidence that items stored on secure datastore 112 were stored by monitoring service 104.

Secure datastore 112 can be configured such that it is readable by one or more applications of the network. In this way, one or more applications may access secure datastore 112 to identify information stored on secure datastore 112. For instance, secure datastore 112 may be readable by one or more of authentication application 102, service application 106, or any other application within the distributed network.

Service application 106 generally provides a service to a user. While service application 106 is illustrated as an application to provide a service to a user or another application, it will be understood that service application 106 can also more broadly represent a second application performing any function in the distributed network.

Service application 106 may provide any number of services within the distributed network. In a specific aspect, service application 106 provides services to a user or another application based on the user's or application's access rights. By way of an example, a user of a photo editing software may have access rights to use the software on multiple devices and may have access to a full suite of photo editing effects. Based on authentication of this user by authentication application 102, service application 106 determines the level of access for the user and provides the user with access to the full suite of photo editing effects. Meanwhile, another user has access rights to use the software on a mobile device with a limited number of photo editing effects. Based on authentication of this user by authentication application 102, service application 106 provides the user with the limited photo editing effects at the user's mobile device. Further still, yet another user may have rights to edit the photo editing software. Based on authentication of this user by authentication application 102, service application 106 may permit editing of the photo editing software. In another example, a service provided by service application 106 determines a license, e.g., rights of the user, and provides services according to the license or passes the determination onto another application that provides services to the user based on the license as determined by service application 106.

In providing services, service application 106 receives information from another application, such as authentication application 102, and may do so in the form of the token, e.g., a JWT. As such, service application 106 receives the generated token from monitoring service 104. The received token is associated with the message comprising the information, such as the status of another application, e.g., the status of authentication application 102. Thus, a JWT may be used as part of the secure communication between applications, including the secure communication of a status of authentication application 102 to service application 106.

Service application 106 validates the received token using token validator 126. Token validator 126 may validate the received token using public key 122. Token validator 126 may also authenticate the token using secure datastore. As an example, using public key 122, token validator 126 may validate a signature of the received token signed by private key 124. Token validator 126 may identify and recall public key 122 based on the received token. That is, in some cases, the token may comprises a key identifier for identifying public key 122 that validates the token signature by private key 124. In the case of JWTs, a header of the JWT may comprise a key identifier that identifies public key 122. Based on this, token validator 126 retrieves the appropriate public key using the key identifier, such as public key 122, and validates the signature. In validating the signature of the token, token validator 126 determines whether private key 124, accessible by monitoring service 104, is the key that provided the signature of the token. In this way, token validator 126 has a degree of confidence that the received token is from monitoring service 104.

To further enhance the security, token validator 126 can determine the authenticity of the received token based on comparing the received token with a stored token in secure datastore 112. As noted, monitoring service 104 stores the token in secure datastore 112, to which monitoring service 104 has write access. Token validator 126 determines whether monitoring service 104 has stored the received token, or a portion thereof, in secure datastore 112. To do so, token validator 126 compares the received token, or any portion thereof, with a stored token stored in secure datastore 112 and determines whether a stored token, or portion thereof, is the same as the received token. In cases where a JWT is used, the entire token, or a portion of the token, is stored on secure datastore 112. For JWTs comprising unique identifiers, the unique identifier may be the portion of the JWT that is stored and compared. By identifying a token stored by monitoring service 104 is the same as the received token, service application 106 has a high degree of confidence that the message associated with the token was provided by monitoring service 104. The level of confidence provided by validating the token using private key 124 and determining the authenticity of the token based on the token being stored by monitoring service 104 is greater than that provided by conventional methods of security.

Further still, service application 106 can apply yet another security level by determining whether the received token is unique, which helps to prevent processing a second message validated by a previously used token. To determine whether the received token is unique, service application 106 employs unique token authenticator 128.

Unique token authenticator 128 generally identifies whether a received token is unique. That is, unique token authenticator 128 may identify whether a received token has been received during a previous timeframe. As noted, some tokens, such as JWTs, may be valid during a specified time, and the token may include an indication of when the token is set to expire, after which time, the token is no longer valid. That is, token validator 126 may process a token during the timeframe in which the token is valid, and may not process the token if the token is received after an expiration period.

Upon receiving a token, unique token authenticator 128 may store the token in datastore 114 to which service application 106 has write access. Unique token authenticator 128 stores the token for a time period equal to or greater than an expiration time identified by the expiry indication of the token. The expiry indication of the token may indicate at time at which the token is to expire or a duration during which the token is valid, and as such, from the expiratory indication, the expiration time of the token, including a JWT, can be identified. Thus, unique token authenticator 128 can store the token in datastore 114 until the expiration time or a time after the expiration time of the token.

When receiving subsequent token (e.g., a second token), unique token authenticator 128 may compare the received subsequent token, or a portion thereof, with stored tokens in datastore 114 to determine if the received token matches a token previously stored by unique token authenticator 128. If the received token, or a portion thereof, such as a unique identifier (e.g., a second unique identifier), matches a stored token, service application 106 has previously processed the received token, and the token or associated message may be rejected, meaning that service application 106 may not act in accordance with or based on the received message. However, if the received subsequent token, or a portion thereof, does not match tokens previously stored by unique token authenticator 128, then service application 106 may proceed with modifying a service in response to the received subsequent token, as it has an increased level of confidence that the received subsequent token was received from monitoring service 104, as opposed to a hacking attempt that could try to use a copy of a previously sent token.

Based on validation and authentication of the received token from monitoring service 104, service application 106 modifies a service being provided to another application or to a user. As noted, service application 106 may provide different services based on the implementation, describing all of which would be impracticable. However, one example includes modifying access rights to a software service, such as a service provided by service application 106 or another application. Service application 106 may provide a limited access to a software service based on the modified access rights. In one case, service application 106 denies software editing rights to software service application 106. In yet another example, the software service provides a limited number of photo editing effects consistent with the access rights. One of ordinary skill in the art will appreciate the various service changes that may be modified by service application 106 in response to validation and authentication of the token. In one particular case, a service application denies or modifies service in response to validation and authentication of the token, and based on a messages associated with the token, such as whether authentication application 102 is experiencing a performance disruption. In a particular embodiment, the modified service being provided is a temporary license for a user that provides temporary access rights to the software service. Service application 106 may continue to provide the modified service until receiving a status from monitoring service 104 that the authentication application 102 is not experiencing the performance disruption.

Figure 2:
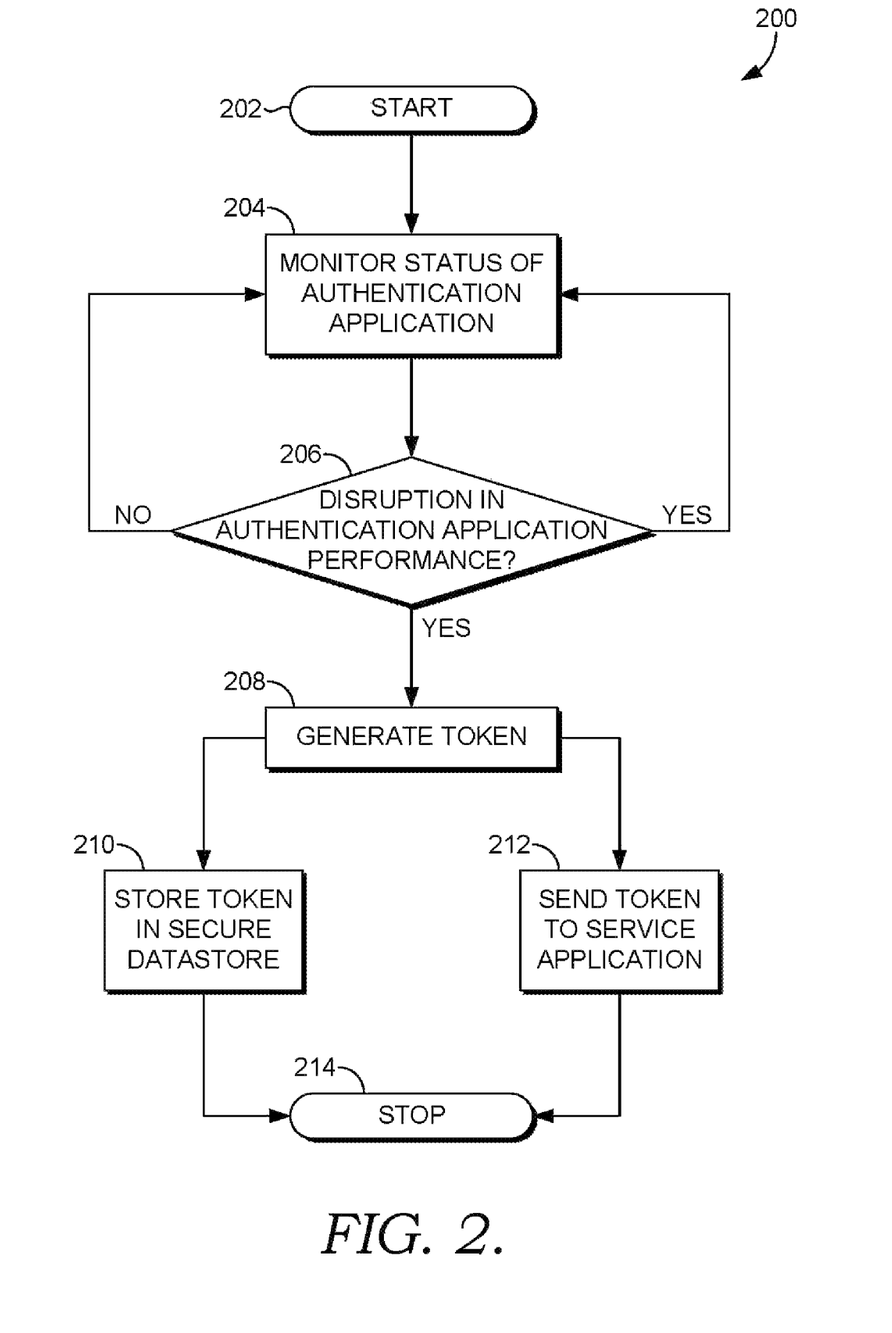
FIG. 2 is a decision flow diagram illustrating an example process by which the monitoring service securely communicates to the service application of FIG. 1, in accordance with an aspect described herein.

With additional reference to FIG. 2, FIG. 2 is a decision flow diagram illustrating an example process 200 by which monitoring service 104 securely communicates to service application 106 of FIG. 1. In particular, process 200 provides an example decision flow that monitoring service 104 may execute when generating a token for securely communicating a message to service application 106.

As illustrated, process 200 begins at start 202. Process 200 proceeds from start 202 to step 204. At step 204, monitoring service 104 monitors the status of authentication application 102. Monitoring service 104 may monitor a status of authentication application 102 during a time in which authentication application 102 is authenticating users or services, as previously described. By monitoring the status of authentication application 102, monitoring service 104 may determine a performance of authentication application 102 while authentication application 102 is authenticating users or services. As described, monitoring service 104 may monitor performance metrics associated with authentication application 102, such as CPU usage, memory usage, or message queue log, among other like methods.

Based on monitoring the status of authentication application 102, at step 206, monitoring service 104 may determine whether there is disruption in the performance of authentication application 102. As has been previously discussed, one example method for determining whether there is a performance disruption is to compare the performance metrics to performance metric thresholds and determine whether a performance metric exceeds a corresponding performance metric threshold, e.g., whether the CPU usage is greater than a threshold CPU usage for the authentication application.

The disruption in the performance could indicate that authentication application 102 is not able to authenticate users or services. As such, an indication of the disruption may be securely communicated to service application 106 so that service application 106 can modify services accordingly. By using secure communication methods, it is less likely that a hacker could exploit the communication between authentication application 102 and service application 106 for malicious purposes.

If there is no performance disruption determined by monitoring service 104, then process 200 may proceed back to step 204 so that monitoring service 104 can continue monitoring authentication application 102. If monitoring service 104 determines a disruption in the performance of authentication application 102, then process 200 may also proceed back to step 204 so that monitoring service 104 continues to monitor authentication application 102.

In cases where monitoring service 104 determines that there is a disruption in the performance of authentication application 102, the process may also proceed to step 208 where monitoring service 104 generates a token. The token may be generated to securely communicate a message indicating the disruption to service application 106 so that service application 106 may act accordingly. In a particular case, the token is a JWT token, and the JWT token may comprise the message indicating the disruption. Monitoring service 104 may generate the token, in part, by signing the message with a private key of a public-private key pair.

Once generated, monitoring service 104 may proceed to step 210 where it stores the token in a secure datastore. The secure datastore may be configured such that it is writable only by monitoring service 104. Additionally, monitoring service 104 may send the generated token to service application 106 as process 200 also proceeds to step 212. In this way, there is secure communication between monitoring service 104 and service application 106. That is because service application 106 can verify the validity of the token by accessing a public key of the public-private key pair and determining that the private key, accessed by monitoring service 104, was the key that provided the signature of the token. This provides a first factor of authentication and some level of confidence that the token comprising the message originated from monitoring service 104.

Service application 106 can perform a second factor of authentication by determining whether the received token is also with in the secure data store. Because the secure datastore is writable by monitoring service 104, and sometimes writable only by monitoring service 104, there is yet another level of confidence that the token associated with the message originated from monitoring service 104. Combined, this provides two factors of authentication and a high degree of confidence as to the origin of the token and its associated message regarding the status of authentication application 102. After the token has been stored in the secure datastore and the token has been sent to service application 106, process 200 may proceed to stop 214.

Figure 3:
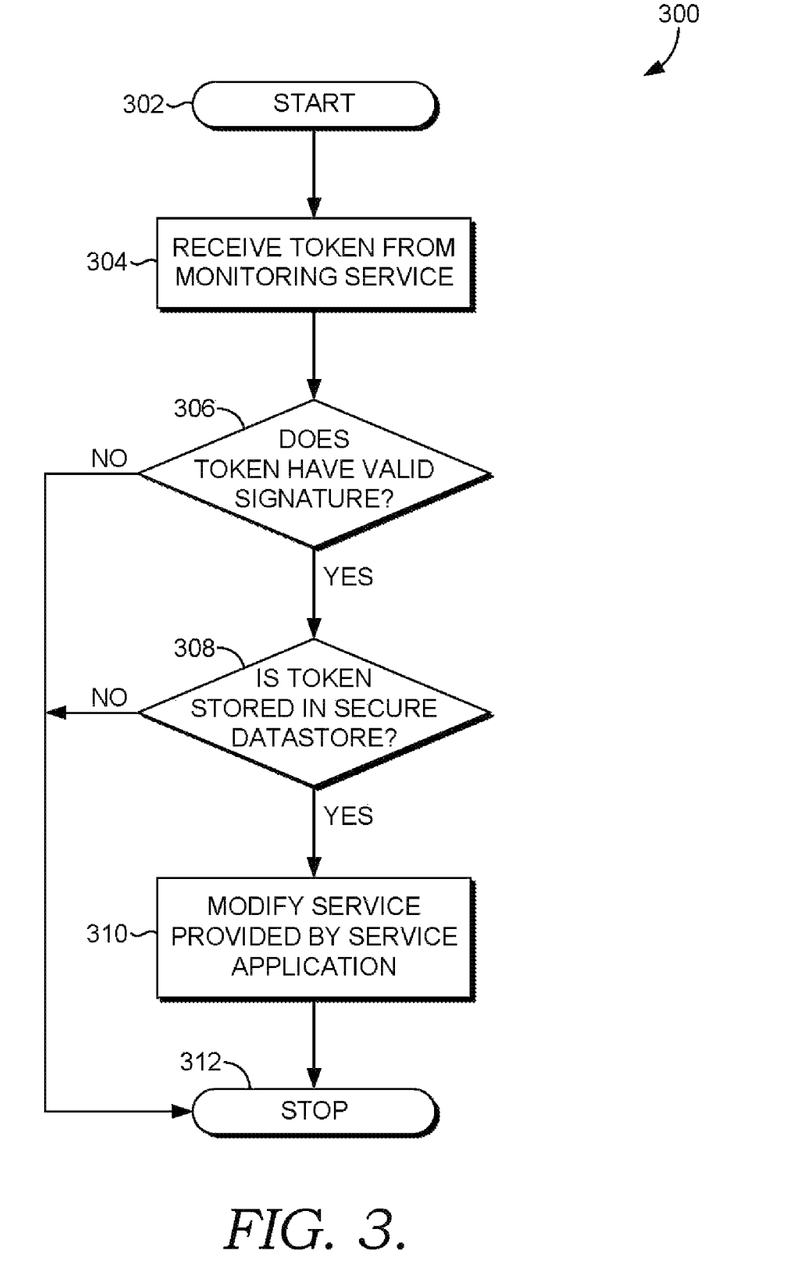
FIG. 3 is another decision flow diagram illustrating an example process by which the service application modifies a service based on a secure communication from the monitoring service of FIG. 1, in accordance with an aspect described herein.

Turning now to FIG. 3, which is also discussed in conjunction with FIG. 1, FIG. 3 provides another decision flow diagram illustrating process 300 by which service application 106 modifies a service based on a secure communication from monitoring service 104 of FIG. 1. Process 300 begins at start 302 and proceeds to step 304.

At step 304, service application 106 receives a token from monitoring service 104. The token may be associated with a message indicating a performance of authentication application 102. Service application 106 may provide services to a user or service based on the user's or service's authentication by authentication application 104. Since service application 106 provides services based on the authentication, service application 106 ensures that the received token actually originated form monitoring service 104 and not from another origin, such as one that might be malicious in nature.

A first factor of authentication that service application 106 uses to ensure the received token is authentic is performed at step 306. Here, service application 106 determines whether the received token has a valid signature. By way of example, service application 106 may access a public key. In some cases, the public key is retrieved by service application using a key identifier, which may be found in the received token. In the case of a JWT, a header of the JWT may comprise the key identifier used by service application 106 to look up and recall the public key from a datastore. Using the public key, service application 106 validates the token by determining whether the associated private key is the private key accessible by monitoring service 104. If so, there is some confidence that monitoring service 104 is the origin of the received token. If the token is validated, then process 300 proceeds to step 308. If the token cannot be validated, then process 300 proceeds to stop 312.

At step 308, service application 106 determines whether the token is stored in a secure database. The secure database may be a database that is configured so that it is writable by or only by monitoring service 104 from which the token was received. This provides a second factor of token authentication. By determining that the token has been previously stored in the secure database, service application 106 has a high degree of confidence that the token originated from monitoring service 104, since monitoring service 104 has write access to the secure database. If the token is not stored in the secure database, process 300 may proceed to stop 312. It should be realized and appreciated that, in some aspects, service application 106 determines whether the token is stored in the secure datastore prior to or contemporaneously with determining whether the signature is valid.

Where the token is stored in the secure database, process 300 may proceed to step 310. At step 310, the service application 106 modifies a service that it is providing. As previously described, service application 106 may provide a variety of different services. As such, service application 106 may modify a service as previously described. Subsequent to service application 106 modifying its services, process 300 may proceed to stop 312.

Methods

Figure 4:
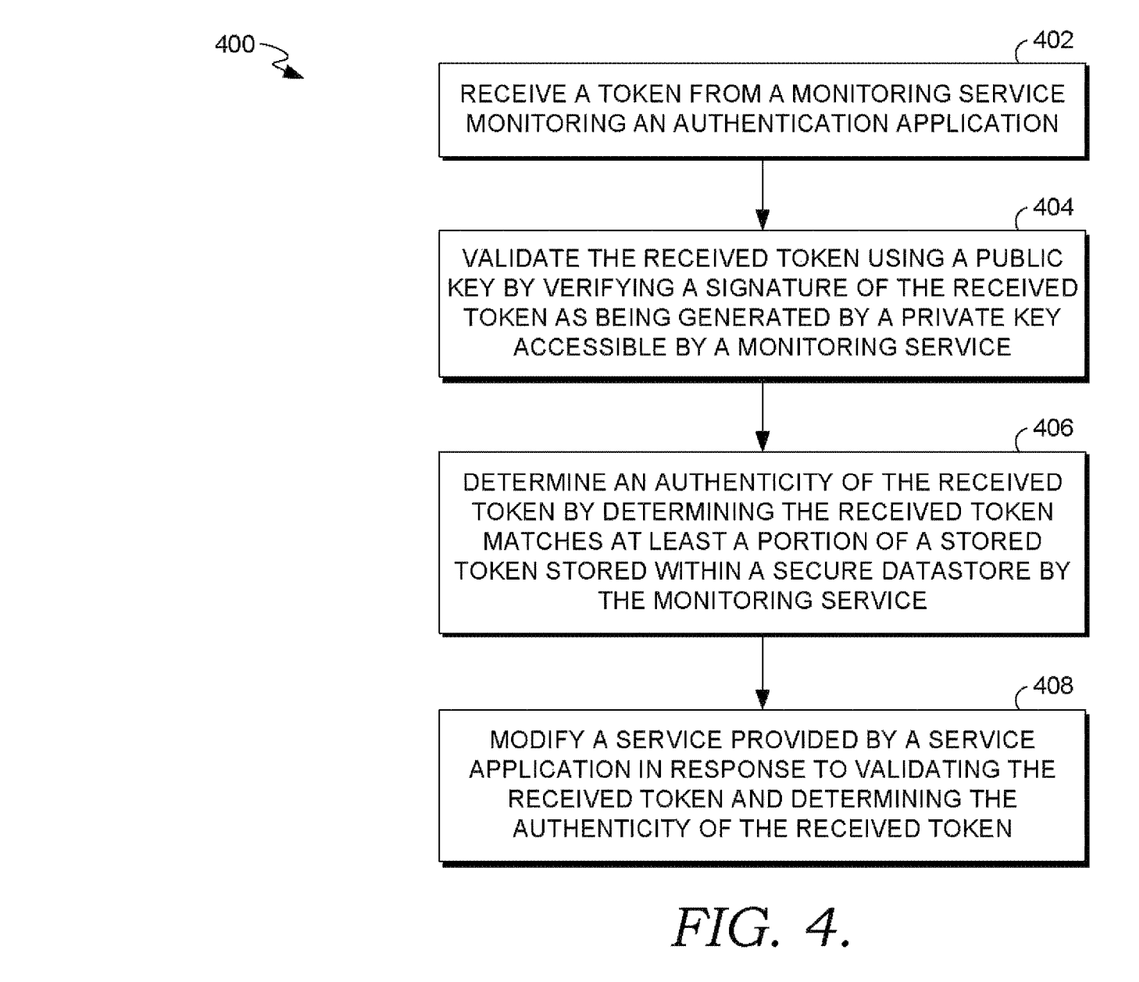
FIGS. 4-5 are block diagrams of example methods for securing communication between the monitoring service and the service application of FIG. 1, in accordance with embodiments described herein.
Figure 5:
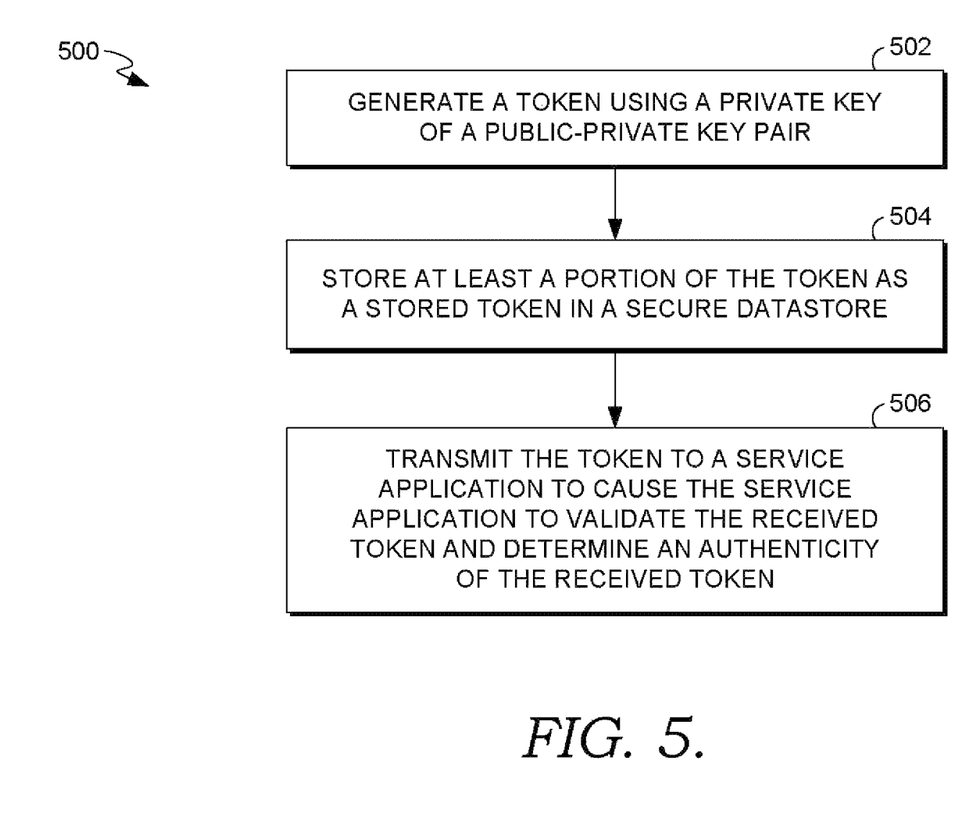

With reference now to FIGS. 4-5, flow diagrams are provided illustrating example computer methods for secure communication. Operations of the methods can be performed using the entities described with reference to FIG. 1, including authentication application 102 or service application 106, or components thereof. Operations of the methods may be performed by one or more processors of one or more computing devices. Operations of the methods may be performed by a system comprising a processor and computer storage media. Operations may be performed by a processor implementing computer-usable instructions stored on one or more computer storage media.

Turning now to FIG. 4 and with reference to FIG. 1, FIG. 4 illustrates a block diagram of example method 400 for secure communication. At block 402, a token is received from a monitoring service, such as monitoring service 104. The token may be received from the monitoring service based on the monitoring service monitoring an authentication application, such as authentication application 102. The token may be associated with a message comprising a status of the authentication application, such as the performance of the authentication application. The message may comprise an indication of a disruption in the performance of the authentication application. The message may be received in response to the monitoring service identifying the status, including the disruption. In one case, the token is generated using a private key of a public-private key pair, where the private key is assessable to the monitoring service. The generated token may be a JWT in some cases.

At block 404, the received token is validated. The received token can be validated by validating a signature associated with the received token is signed by the private key of the public-private key pair. The public key may be identified using the token. That is, the token may provide a key identifier that identifies a public key stored on a datastore. The method may include retrieving the public key from the datastore.

At block 406, an authenticity of the received token is determined. The authenticity can be determined by comparing the received token, or a portion thereof, to a stored token stored on a secure database writable by the monitoring service monitoring the authentication application. In a specific case, the secure datastore is writable only by the monitoring service. The authenticity may be determined by identifying that the received token matches the stored token, or the portion thereof. In this way, the system is confident that the received token was generated and sent by the monitoring service.

The method may further comprise storing the received token in a datastore for a time period. The datastore can be a different datastore than the secure datastore associated with the monitoring service, and the datastore may be writable by the service application, among other applications and services. The received token may be stored for a time equal to or greater than an expiration time of the token. Upon receiving a second or subsequent token, the second token may be compared to those stored in the datastore to determine whether the second token has been previously received prior to the expiration of the second token.

At block 408, a service provided by a service application, such as service application 106, is modified in response to validating the received token and determining the authenticity of the received token. The modification of the service may be determined based on a status of the authentication service. For instance, a service application may issue a temporary license for a software service based on a disruption in the authentication application. In some aspects, the modification to the service may be further based on whether the received token has been previously received and processed. That is, the received token may be compared to tokens stored for a time equal to or greater than an expiration time of the tokens. If the received token is not among the tokens stored base on the expiration time, then the received token has not been previously received and processed during the time the token is valid. Thus, in an aspect, modification of the service may be further based on determining that the received token is not present in a datastore of tokens stored based on their expiration.

Turning now to FIG. 5 and with continued reference to FIG. 1, FIG. 5 is a block diagram illustrating example method 500 for secure communication. At block 502, a token is generated. To generate the token, token generator 120 of monitoring service 104 may be employed. The token may be generated using any method of encryption. In one aspect, a private key accessible to the monitoring service is used to generate the token. In some cases, the method includes generating the public-private key pair. The public key can be published by storing it on a datastore that is readable by other components of the distributed network, such as a service application.

The token may comprise or otherwise be associated with a message indicating a status of an authentication application, such as authentication application 102. The message may comprise an indication of a disruption in the performance of the authentication application identified by the monitoring service. One particular application of the technology uses a JWT and the JWT is signed using the private key of the monitoring service. The JWT provides an indication of the status or disruption associated with the authentication application. The JWT may further comprise a header comprising a key identifier that is used to identify the public key of a public-private key pair associated with the private key and the public key, a unique token identifier, and an expiry indication that identifies an expiration time of the JWT.

At block 504, the generated token is stored in secure datastore. The secure datastore can be configured such that it is writable by the monitoring service. The secure datastore could be configured such that it is writable only by the monitoring service. Secure datastore 112 of FIG. 1 is suitable as the secure datastore. A portion of the token may be stored in the secure datastore. With some tokens, such as JWTs, a unique identifier of the token may be stored in the secure datastore.

At block 506, the token generated at block 504 is transmitted to a service application, such as service application 106. An encrypted communication channel, such as HTTPS, can be used to transmit the token to the service application. The service application can have read-only access to the secure datastore in which the token was stored by the monitoring service. The transmission of the token may cause the service application to validate the token. The token can be validated by the service application using the public key of the public-private key pair. The transmission of the token may cause the service application to authenticate the token based on the stored token in the secure datastore. In causing the service application to perform these functions, or other functions, the token may be transmitted with computer code instructing the service application to perform such functions or the service application may be configured to implement such functions in response to receiving or based on receiving the transmitted token.

Operating Environment

Figure 6:
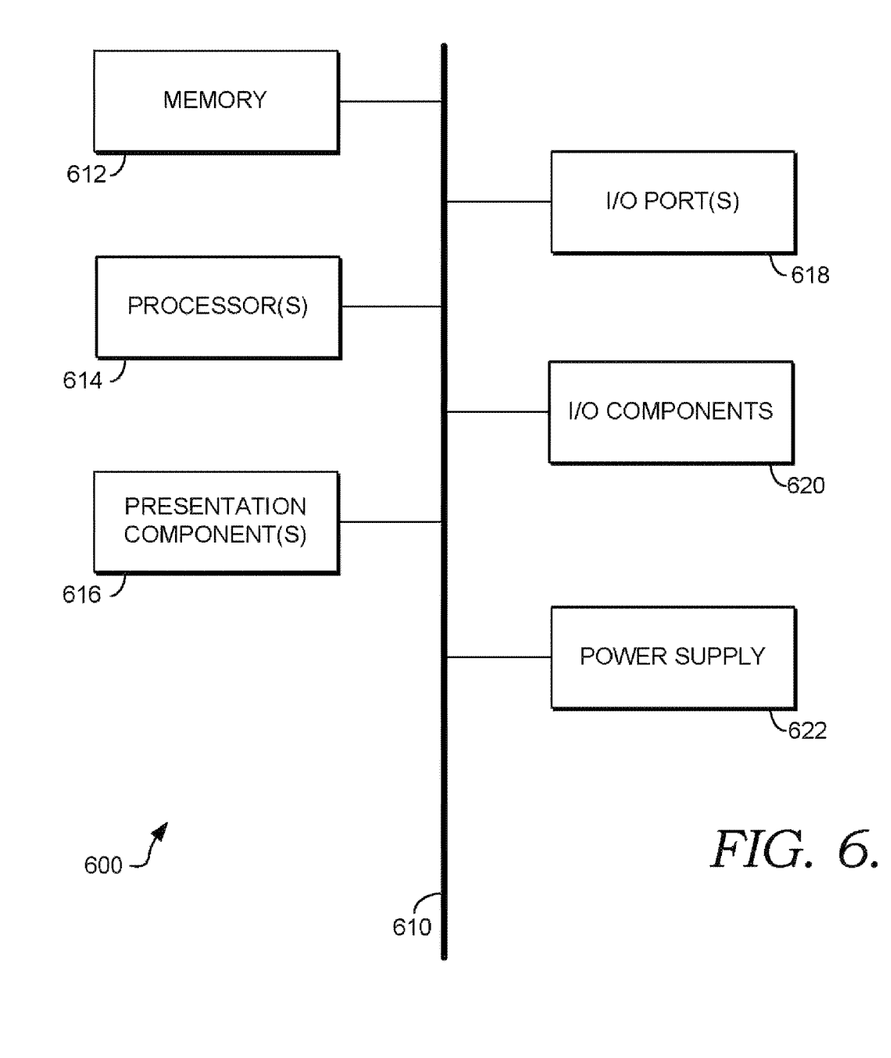
FIG. 6 is a block diagram of an example operating environment in which embodiments of the present technology may be employed.

Having described an overview of the technology, an example operating environment in which the technology may be implemented is described to provide a general context for various aspects. With reference to FIG. 6, an example operating environment is shown and designated generally as computing device 600. One or more components of computing device 600 comprises a computer system. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

In many cases, the technology may be described in the general context of computer code or machine-usable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

Computing device 600, as illustrated, includes bus 610 that directly or indirectly couples the following devices: memory 612, one or more processors 614, one or more presentation components 616, input/output (I/O) ports 618, input/output components 620, and illustrative power supply 622. Bus 410 represents what may be one or more busses (such as an address bus, data bus, or combination thereof).

Although the various blocks of FIG. 6 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 6 is merely an example computing device that can be used in connection with one or more embodiments of the described technology. Distinction is not made between such categories as "workstation," "server," "laptop," "hand-held device," etc., as all are contemplated within the scope of FIG. 4 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store information and that can be accessed by computing device 600. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile or nonvolatile memory. Memory 612 may be removable, non-removable, or a combination thereof. Example hardware devices include solid-state memory, hard drives, optical-disc drives, and so forth. Computing device 600 includes one or more processors that read data from various entities such as memory 612 or I/O components 620. Presentation component(s) 616 present data indications to a user or other device. Example presentation components include a display device, speaker, printing component, vibrating component, and so forth.

I/O ports 618 allow computing device 600 to be logically coupled to other devices including I/O components 620, some of which may be built in. Illustrative components include a microphone, joystick, game pad, satellite dish, scanner, printer, wireless device, and the like. I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600.

Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described support secure communication. The components described in this disclosure refer to integrated components. The integrated components refer to the hardware architecture and software framework that support functionality using an application or other component. The hardware architecture refers to physical components and interrelationships thereof, and the software framework refers to software providing functionality that can be implemented with hardware embodied on a device.

At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable (-usable or -readable) instructions include any software, including low level software written in machine code, higher level software such as application software and any combination thereof. In this regard, the components of the distributed network system can manage resources and provide services for the functionality described herein. Any other variations and combinations thereof are contemplated with embodiments of the present disclosure.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or "transmitters" using communication media described herein. Also, the word "initiating" has the same broad meaning as the word "executing" or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer the schematics described and illustrated herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A computerized method of secure communication performed by one or more computer processors, the method comprising:
   receiving, from a monitoring service monitoring an authentication application, a token generated by the monitoring service using a private key of a public-private key pair, the token associated with a message indicating a disruption in a performance of the authentication application identified based on the monitoring;
   validating the received token using a public key of the public-private key pair by verifying a signature of the received token as being generated by the private key accessible by the monitoring service;
   determining an authenticity of the received token by determining the received token matches at least a portion of a stored token stored within a secure datastore by the monitoring service having write access to the secure datastore; and
   modifying a service provided by a service application based on the disruption in the performance of the authentication application in response to validating the received token and determining the authenticity of the received token.

2. The method of claim 1, wherein the secure datastore comprising the stored token is writable only by the monitoring service.

3. The method of claim 1, wherein the received token is a JavaScript Object Notation (JSON) Web Token (JWT).

4. The method of claim 3, further comprising retrieving the public key using a key identifier within a header of the JWT, wherein the key identifier identifies the public key stored in a datastore by the monitoring service generating the public-private key pair.

5. The method of claim 3, wherein the JWT comprises an expiry indication identifying an expiration time of the JWT.

6. The method of claim 5, further comprising storing the JWT in a datastore writable by the service application, the JWT being stored for a time equal to or greater than the expiration time.

7. The method of claim 3, wherein the service being provided comprises issuing a license identifying access rights to a software service, and the service is modified by issuing a temporary license with temporary access rights to the software service.

8. The method of claim 1, further comprising:
receiving a second token from the monitoring service; and
comparing the second token to tokens stored in a datastore writable by the service application, wherein modifying the service provided by the service application is further based on the second token not being stored among the tokens in the datastore.

9. A computer system for secure communication, the computer system comprising:
at least one processor; and
one or more non-transitory computer storage media storing computer-usable instructions that when executed by the at least one processor, cause the at least one processor to:
receive from a monitoring service monitoring an authentication application a token signed by a private key of a public-private key pair, the private key being accessible by the monitoring service, wherein the token is associated with a message indicating a disruption in a performance of the authentication application;
validate a signature of the token signed by the private key using a public key of the public-private key pair;
determine authenticity of the token by identifying a copy of a unique identifier of the token is stored in a secure datastore, the copy of the unique identifier being stored by the monitoring service having write access to the secure datastore; and
modify a service provided by a service application based on validating the signature of the token and determining the authenticity of the token.

10. The system of claim 9, further comprising:
receive a second token from the monitoring service; and
compare a second unique identifier of the second token with unique identifiers of tokens stored in a datastore writable by the service application, wherein the service provided by the service application is modified further based on the second unique identifier of the second token not being stored among the unique identifiers of the tokens in the datastore.

11. The system of claim 9, further comprising:
store the token in a datastore writable by the service application, the token being stored for a time equal to or greater than an expiration time identified by an expiry indication comprised within the token.

12. The system of claim 9, further comprising:
retrieve the public key using a key identifier, the key identifier being provided in a header of the token and identifying the public key stored in a datastore by the monitoring service generating the public-private key pair.

13. The system of claim 9, wherein the secure datastore storing the copy of the unique identifier of the token is writable only by the monitoring service.

14. The system of claim 9, wherein the service being provided by the service application comprises issuing a license identifying access rights to a software service, and the service is modified by issuing a temporary license with temporary access rights to the software service.

15. One or more non-transitory computer storage media having computer-usable instructions that when used by a computing device, cause the computing device to perform a method for secure communication, the method comprising:
receiving, from a monitoring service monitoring an authentication application, a token generated by the monitoring service using a private key of a public-private key pair, the token associated with a message indicating a disruption in a performance of the authentication application identified based on the monitoring;
validating the received token using a public key of the public-private key pair by verifying a signature of the received token as being generated by the private key accessible by the monitoring service;
determining an authenticity of the received token by determining the received token matches at least a portion of a stored token stored within a secure datastore by the monitoring service having write access to the secure datastore; and
modifying a service provided by a service application based on the disruption in the performance of the authentication application in response to validating the received token and determining the authenticity of the received token.

16. The media of claim 15, wherein the secure datastore comprising the stored token is writable only by the monitoring service.

17. The media of claim 15, wherein the received token is a JavaScript Object Notation (JSON) Web Token (JWT).

18. The media of claim 17, further comprising retrieving the public key using a key identifier within a header of the JWT, wherein the key identifier identifies the public key stored in a datastore by the monitoring service generating the public-private key pair.

19. The media of claim 17, wherein the JWT comprises an expiry indication identifying an expiration time of the JWT.

20. The media of claim 19, further comprising storing the JWT in a datastore writable by the service application, the JWT being stored for a time equal to or greater than the expiration time.

* * * * *